United States Patent
Finlay et al.

(10) Patent No.: US 6,907,771 B2
(45) Date of Patent: Jun. 21, 2005

(54) LEAK DETECTOR

(75) Inventors: Geoff Finlay, Brampton (CA); David Clumpus, Palgrave (CA)

(73) Assignee: Quality Fabricating Ltd., Brampton (CA)

( * ) Notice: Subject to any disclaimer, the term of this patent is extended or adjusted under 35 U.S.C. 154(b) by 6 days.

(21) Appl. No.: 10/650,536

(22) Filed: Aug. 28, 2003

(65) Prior Publication Data

US 2005/0044930 A1 Mar. 3, 2005

(51) Int. Cl.⁷ .............................................. G01M 3/04
(52) U.S. Cl. ...................................................... 73/40.7
(58) Field of Search ............................ 73/40.7; 239/338

(56) References Cited

U.S. PATENT DOCUMENTS

| | | | |
|---|---|---|---|
| 1,400,657 A | | 12/1921 | Brodie |
| 2,279,147 A | | 4/1942 | Stimson |
| 3,407,123 A | | 10/1968 | Perterson |
| 3,483,735 A | | 12/1969 | Packo |
| 3,523,771 A | | 8/1970 | Anderson |
| 3,683,675 A | | 8/1972 | Burton, Jr. et al. |
| 3,690,151 A | * | 9/1972 | Briggs .................... 73/40.7 |
| 4,155,249 A | | 5/1979 | Scott |
| 4,504,408 A | | 3/1985 | Morton |
| 4,620,670 A | * | 11/1986 | Hughes .................. 239/338 |
| 5,107,698 A | | 4/1992 | Gilliam |
| 5,134,877 A | * | 8/1992 | Gilles et al. ............ 73/40.7 |
| 5,335,536 A | | 8/1994 | Runnevik |
| 5,601,799 A | | 2/1997 | Binz et al. |
| 5,650,563 A | | 7/1997 | Cooper et al. |
| 5,679,553 A | | 10/1997 | Van Gemen et al. |
| 6,142,009 A | | 11/2000 | Loblick |
| 6,170,320 B1 | | 1/2001 | Scaringe et al. |
| 6,327,897 B1 | * | 12/2001 | Scaringe et al. ............ 73/40.7 |
| 6,392,227 B1 | * | 5/2002 | Banyard et al. ............ 250/302 |
| 6,477,890 B1 | | 11/2002 | Hulsubus |
| 6,526,808 B1 | | 3/2003 | Pieroni et al. |

FOREIGN PATENT DOCUMENTS

| | | |
|---|---|---|
| CA | 1331507 | 8/1994 |
| CA | 2216476 | 3/1999 |
| CA | 2238301 | 11/1999 |

* cited by examiner

Primary Examiner—Hezron Williams
Assistant Examiner—John Fitzgerald
(74) Attorney, Agent, or Firm—Dimock Stratton LLP; Mark B. Eisen

(57) ABSTRACT

A leak detecting apparatus is provided that tests for leaks in closed systems such as the air intake system of an internal combustion engine. The system connects to a conventional air supply that provides air under pressure. The air from the air supply is routed through a fluid tank where the air is directed against the fluid thereby generating fog. The fluid is preferably a mineral oil. The fog is routed out of the apparatus and is fed into the system for detecting leaks. Leaks are observed visually when the fog escapes from cracks or fissures in the system being tested. In order to aid in the observation of the fog escaping from the leaks, a light reflective pigment is added to the fluid thereby making the fog easier to observe upon the application of white light to the fog.

13 Claims, 4 Drawing Sheets

LEAK DETECTOR

PRIORITY CLAIM

The present application claims priority to Canadian Patent Application No. 2,438,448 filed Aug. 27, 2003, the entirety of which is hereby incorporated by reference.

FIELD OF THE INVENTION

The invention relates to an apparatus for generating vapour and delivering the vapour under pressure to a closed system to test for leaks in the closed system.

BACKGROUND

Devices for detecting leaks have existed for many years. These devices typically involve the introduction of a visible vapour such as smoke or fog into the system being tested. Leaks would then be detected visually as the vapour escaped through tiny cracks or holes in the system. These devices are useful for testing for leaks in hydraulic or gas systems, air craft pipe systems and pipe systems in ships for example.

Many leak detector apparatuses employ smoke to test for leaks. For example, U.S. Pat. No. 5,107,698 describes an apparatus for testing an internal combustion engine for vacuum leaks. For example, the apparatus generates smoke in a chamber and pumps the smoke into the intake manifold of a vacuum system in an internal combustion engine. Leaks are detected upon the escape of smoke. The fact that this apparatus produces smoke is problematic in that smoke is potentially toxic to workers operating the apparatus. Also, the introduction of smoke into the atmosphere causes environmental concerns.

To address this problem, other apparatuses have been developed to test for leaks with the use of smoke and ultraviolet dye as a vapour. However, these apparatuses require the vapours generated to be heated. They therefore employ heat elements to generate vapours for detection purposes. U.S. Pat. No. 6,392,227 for example discloses a system that generates a marker vapour that incorporates a fluorescent substance. The vapour stain is detected using ultraviolet light when escaping from a leak in the system being tested. This system however requires that the vapour be heated. This is a disadvantage because of the increased energy required to operate the device. Also, the heating element can be a fire hazard. In the event of a malfunction in the heating element circuit, a fuel tank explosion is a potential hazard in testing systems such as evaporative emissions systems in the automotive industry. To reduce or eliminate the possibility of combustion, an inert gas such as nitrogen is currently required to propel the smoke in these types of machines.

There is therefore a need for an apparatus for testing leaks in a system being tested that that does not employ smoke and that does not require that the medium being used to detect and indicate the location of leaks to be heated.

It is an object of the present invention to provide an apparatus that is effective for detecting leaks in systems wherein the apparatus generates a vapour other than smoke that does not need to be heated.

It is a further object of the present invention to provide an apparatus for detecting leaks that is connectable to an air supply.

It is a further object of the present invention to provide an apparatus for detecting leaks that employs fog as a medium under pressure for detecting leaks.

It is yet a further object of the present invention to provide a leak detector that provides a higher volume of vapour to a system being tested and a higher fill rate than conventional existing leak detectors.

It is a further object of the present invention to provide a leak detecting apparatus that applies preset pressure ranges of detection vapour to the system being tested for safe and reliable detection of leaks.

SUMMARY OF THE INVENTION

The invention provides a leak detector that is either connectable to an external air supply or has an internal air supply in the form of an internal pump for example. The air from the air supply enters a conduit that passes through a vapour tank. A vapour is delivered, by another conduit, from the vapour tank to the system being tested. The vapour is generated when fluid located in the vapour tank contacts air from the conduit. Heating is not required for the production of vapour. A preferred fluid is a mineral oil based fluid. The vapour may optionally include a light reflective pigment in dispersion for easier visual detection.

According to one aspect of the present invention, there is provided a leak detector for connection to an air supply. The leak detector is adapted to deliver vapour under pressure to a system for detecting leaks in the system. The leak detector comprises:

a tank defining a fluid chamber for holding a quantity of fluid, the tank further defining an inlet and outlet;

a first conduit for delivering air from the air supply to the fluid chamber. The first conduit has a first end for attachment to the air supply and a second end received in the inlet. The second end of the conduit is positioned to direct a flow of air from the air supply into the fluid chamber against the fluid thereby generating a vapour; and a second conduit for delivering the vapour from the fluid chamber to the closed system. The second conduit has a first end received in the outlet and a second end receivable in the system being tested for delivering vapour under pressure to the system for testing for leaks in the system.

According to another aspect of the present invention there is provided a leak detector for connection to an air supply, the leak detector being adapted to deliver a vapour under pressure to a system for detecting leaks in the system, the leak detector comprising:

a housing defining a chamber. The housing further defines first and second openings;

a tank located in the chamber, the tank defining a fluid chamber for holding a quantity of fluid. The tank further defining an inlet and outlet;

a first conduit for delivering air from the air supply to the fluid chamber. The first conduit has a first end for attachment to the air supply and a second end received through both the first opening of the chamber and the inlet of the fluid chamber for delivering air from the air supply to the fluid chamber. The second end of the first conduit is positioned in the fluid tank to direct air against the fluid whereby a vapour is generated in the tank by contact of the air against the fluid; and a second conduit located in the chamber for delivering vapour from the fluid chamber to the system. The second conduit has a first end received in the outlet of the fluid chamber and a second end received through the second opening of the housing for connection to the system;

According to yet another aspect of the present invention, there is provided a leak detector for delivering vapour under pressure to a system for detecting leaks in the system, the leak detector comprising:

a fluid tank defining a chamber therein, the fluid tank defining first and second openings;

a vapour producing fluid located in the fluid tank;

an air supply;

a first conduit for delivering air from the air supply to the fluid tank, the first conduit having a first end attached to the air supply and a second end received in the first opening of said fluid tank; and a second conduit for delivering the vapour from said fluid tank to the system, the second conduit having a first end received in the second opening of the fluid tank and a second end receivable in said system.

DETAILED DESCRIPTION OF THE PREFERRED EMBODIMENT

Figure 1:
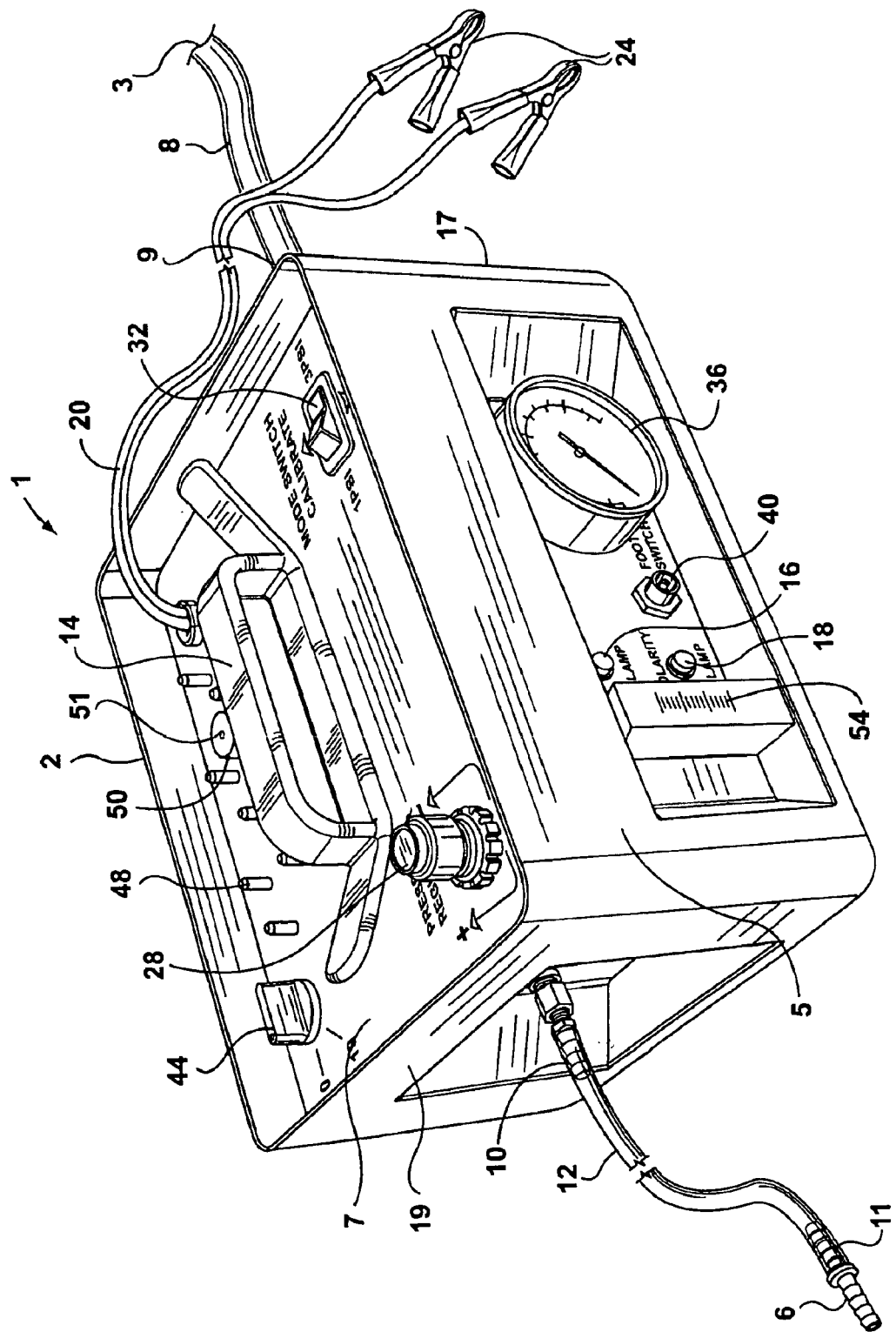
FIG. 1 is a front perspective view of a preferred embodiment of the present invention.

Leak detector apparatus 1 includes a housing 2. The housing 2 has a front portion 5, a top portion 7 and side portions 17, 19. The housing 2 defines a chamber 80 formed therein. An air supply conduit 8 is received through side portion 17 of housing 2. Air supply conduit 8 is preferably a flexible hose. The air supply conduit 8 has a first end 3 which is preferably attachable to a conventional external air supply and a second end 9 which is received through the housing 2 for delivering air under pressure into the chamber 80. Although it is preferable for the apparatus 1 to be used in conjunction with an external air supply, alternate embodiments that employ an internal air supply located in the housing 2 such as an internal pump are within the scope of the present invention.

An outflow conduit 12 which is preferably a flexible hose is received through side 19 of the housing 2. The outflow conduit 12 has a first end 10 which is received through the housing 2 for communication with the interior chamber 80. The outflow conduit 12 has a second end 11 for connection to a system being tested for leaks. The connection is preferably accomplished by virtue of air supply coupling 6.

A flow gauge 54 is located on the front portion 5 of housing 2. A flow lamp 16 and a polarity lamp 18 are also located on the front of the housing 2. A foot switch port 40 is located on the front of the housing for connection to a switch by way of a conventional attachment. The switch would preferably be a bulb switch. A pressure gauge display 36 is also located on the front of the housing 2.

Figure 2:
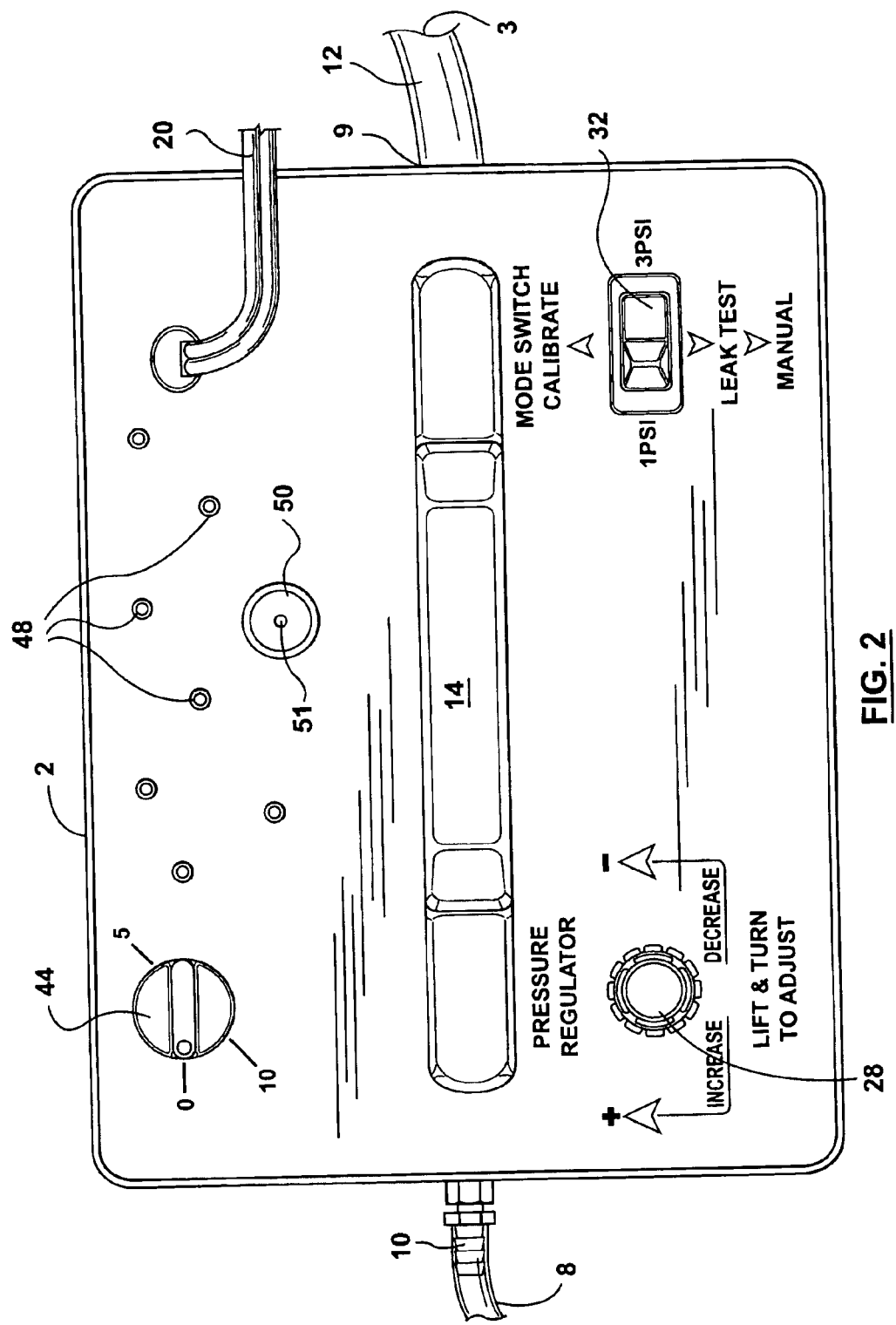
FIG. 2 is a top view of the preferred embodiment shown in FIG. 1.

As shown in FIGS. 1 and 2, a handle 14 is preferably attached to the top surface of 7 of housing 2 for the purpose of portability. A knob 44 for a timer 65 (shown in FIG. 3) is located on the top surface 7. A knob 28 is located on the top surface 7. The knob 28 operates air pressure regulator 70 (shown in FIG. 3). Mode calibration switch actuator 32 is located on top surface 7. Actuator 7 interacts with air valve 56 (shown in FIG. 3). The mode calibration switch actuator is movable between a first position which is preferably marked 1 psi, a second position which is unmarked and a third position which is preferably marked 3 psi.

Electrical line 20 is connected to the leak detector 1 through the top surface 7 of housing 2. Leads 24 are attached to the electrical line and connect to the poles of a conventional battery. A plurality of pegs 48 may be attached to the top surface 7. Each of the pegs 48 is adapted to receive an adapter 50. Each adapter 50 has an opening 51 for engaging a peg 58. The opening of adapter 50 may also engage the coupling 6 for the purposes of engaging certain types of systems that are to be tested for leaks but which do not fit coupling 6.

Figure 3:
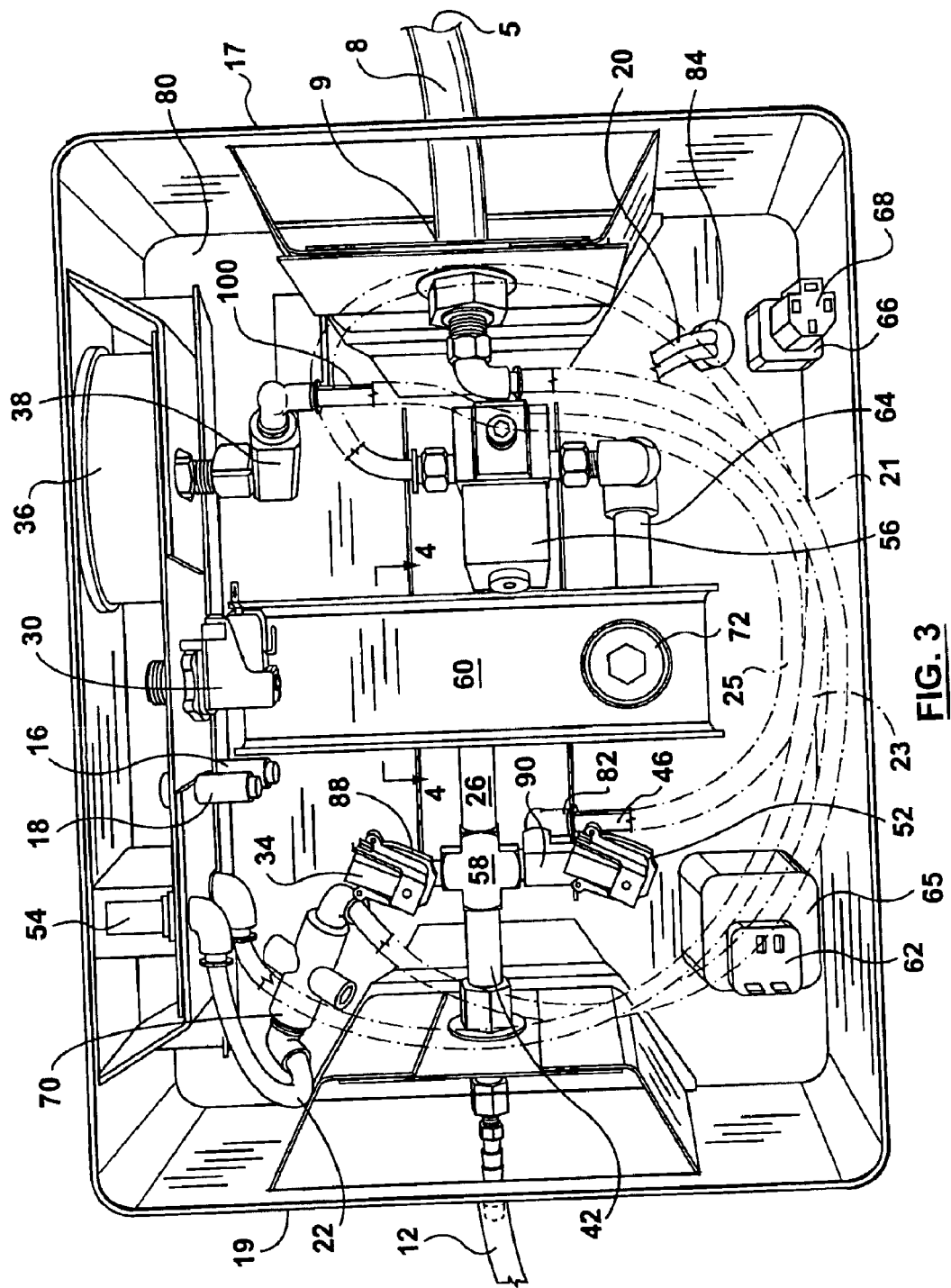
FIG. 3 is a bottom perspective view of the preferred embodiment with a portion cut away to show internal features of the preferred embodiment.

The internal features of the leak detector are shown in FIG. 3. The internal components of the leak detector are located within the chamber 80. Vapour tank 60 is located in the chamber 80. The vapour tank 60 contains a fluid 78 depicted in FIG. 5. The fluid is preferably a mineral oil. The preferred mineral oil based fluids for the present invention are zinc sulphide compounds and rare earth compounds. However, other fluids that are capable of generating a vapour upon contact with a stream of air are within the scope of the invention. For the purposes of the present invention, the meaning of the word air includes all gases including inert gases such as nitrogen. The meaning of vapour includes fog and smoke according to the present invention. The mineral oil preferably includes a light reflective pigment using a surfactant to create a smaller sized pigment in a stable dispersion. The preferred light reflective pigment is rare earth alkaline aluminate photoluminescence pigment. The preferred light reflective pigments are zinc sulphide compounds and rare earth compounds. However, other light reflective pigments may also be used. Other additives to the fluid that improve the visibility and detection of the vapour generated from the fluid including fluorescent substances detectable by ultraviolet light are also within the scope of the invention.

Figure 4:
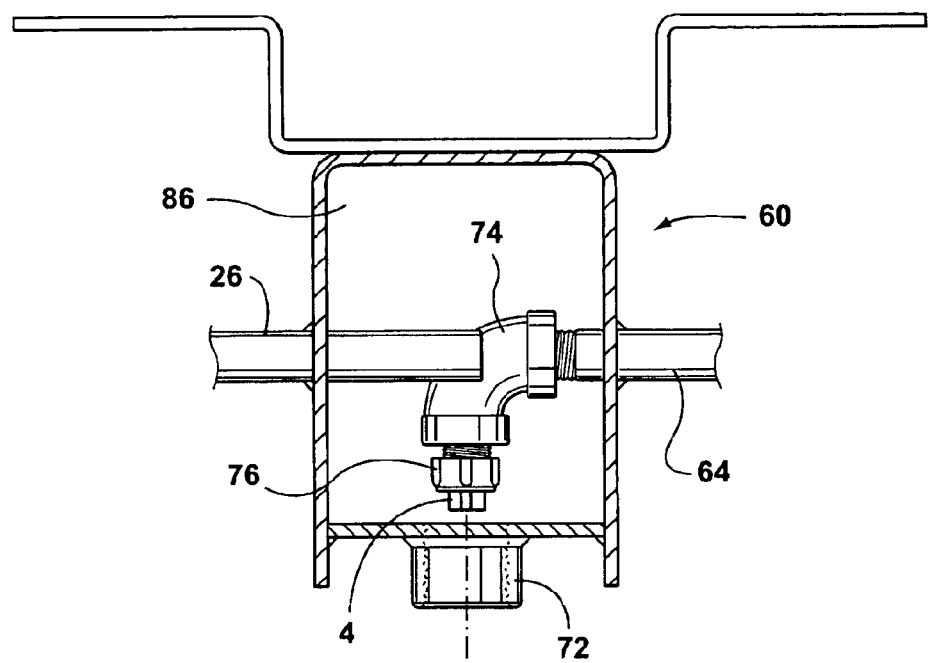
FIG. 4 is a cross sectional view taken along lines 4—4 of FIG. 3.

The internal features of the vapour tank 60 are shown in FIG. 4. The vapour tank 60 defines a chamber 86. The pre-vapour fluid 78 is received in the chamber 86. Conduit 64 is received in the vapour tank 60 and is connected to spray nozzle conduit 74. Spray nozzle 76 is attached to an end of spray nozzle conduit 74. A well 4 is attached below the nozzle 76. The well 4 gathers fluid and is also used to fill the vapour tank 60 initially during assembly. A well plug 72 is attached to vapour tank 60.

Conduit 8 is received through the side 17 of housing 2. Hoses 21, 22, 23, 25 transport air and/or fog through the apparatus 1. Preferably, the hoses are made of nylon and are ¼" in diameter. The hoses are preferably flexible and have preferably push to connect fittings. Conduit 8 connects to hose 21. The hose 21 extends to and is received in air pressure regulator 70. Hose 22 connects air pressure regulator 70 to flow gauge 54. Hose 23 is connected to flow gauge 54 and extends to and is connected to air valve 56. Conduit 64 connects the air valve 56 to the vapour tank 60. Hoses, 21, 22, 23 and conduit 64 form a first conduit for delivering air from the air supply to the fluid chamber.

Hose 25 is connected to exhaust air outlet 82 and extends between exhaust air outlet 82 and pressure gauge 38. Hose 25 is received in pressure gauge 82.

Vapour tank outlet 26 connects to cross-piece 58. The cross piece 58 is connected to exhaust air outlet 82. The cross piece 58 is also connected to exterior outlet 42. The vapour tank outlet 26, the exterior outlet 42 and the outflow conduit 12 form a second conduit for delivering the vapour from the fluid chamber 60 to the system to be tested for leaks.

Rear portions of the flow lamp 16 and the polarity lamp 18 are located in the chamber 80. Foot switch 30 is located in the chamber 80 as is relay assembly 66 and relay plug 68. Receptacle 84 for electrical cord 20 is located in the chamber 80. Rear portion of the timer 65 is located in the chamber 80. Spade connector 62 is attached to the timer 65.

Mode calibration switch 34 is attached to attachment 88 of cross-piece 58. Pressure limiting switch 52 is attached to attachment 90 of cross-piece 58.

Figure 5:
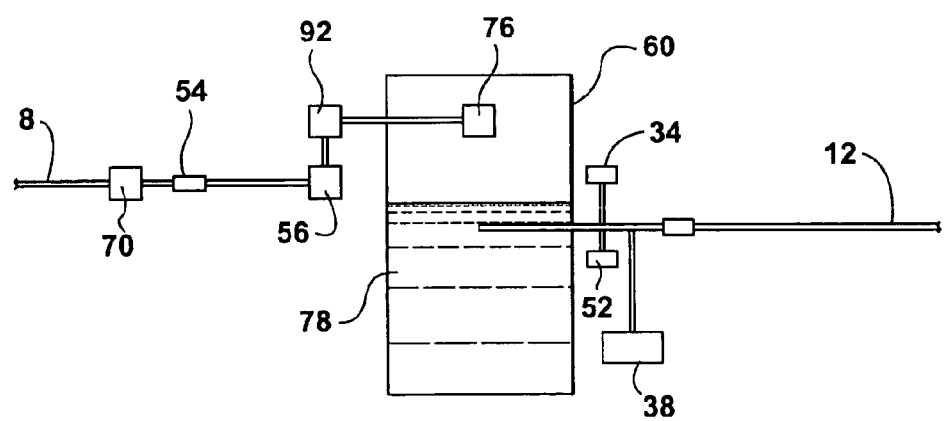
FIG. 5 is a schematic depiction of the preferred embodiment of the present invention.

The operation of the preferred embodiment of the leak detector is shown schematically in FIG. 5. Air supply conduit 8 is connected to a conventional air supply known in the art. Air is introduced into air supply conduit 8. The air flows from the air supply conduit 8 into hose 21. The air then flows through hose 21 to the air pressure regulator 70. The air pressure regulator 70 controls the pressure of the air that enters the apparatus 1. The air pressure is generally in the range of 0–15 psi entering the apparatus 1. The air flows through the air pressure regulator 70 and then through hose 22 into the flow gauge 54. The flow gauge 54 provides a visual display of the rate of air flow. The display is preferably in the unit of standard cubic feet per hour (SCFH). Air from the flow gauge 54 flows through hose 23 to air valve 56. Air valve 56 is preferably an electronically operated on/off valve. The valve 56 functions to either allow or prevent the flow of air through the valve. The air valve 56 is operated by either the timer 65 which is preferably electrically controlled or manually operated by foot switch 30. The foot switch 30 control can be located at distance from the apparatus 1 so that the operator may shut off the apparatus 1 when checking for leaks at a distance from the apparatus 1.

A check valve may optionally be included between the air valve 56 and the spray nozzle 76. The check valve ensures that the liquid in the vapour tank cannot flow back under pressure. Air flows from hose 23 through conduit 64 and then through the spray nozzle conduit 74. Air from the conduit 74 flows through the spray nozzle 76 which directs the air flow against the fluid 78. The spray nozzle is preferably configured to spray air at a specific angle on the fluid to most efficiently disperse the fluid as vapour. The vapour generated is preferably fog.

Vapour under pressure flows from the vapour tank 60 through conduit 26 to cross piece 58. The apparatus preferably includes the switches 34, 56 which are pressure activated switches that can be preferably set to 1 psi and 3 psi respectively using mode calibration switch actuator 32 as shown in FIGS. 1 and 2. These preset switch values are pre-set by the operator to inhibit the opening of air valve 56 by electrical connection between switches 34, 52 and air valve 56. Alternate embodiments of the invention that do not include switches 34, 52 are within the scope of the present invention. Vapour flows out of the apparatus through outlet conduit 42 to outflow conduit 12. Outflow conduit 12 is preferably a flexible, clear 6' inch hose. Coupling 6 is adapted to connect with an inlet of the system being tested in order to deliver vapour under pressure to the system being tested. Adapter 50 may be attached to coupling 6 in order to fit inlets of other systems being tested that are not sized to securely accept the coupling 6.

Leaks in the system are detected visually upon the escape of vapour from cracks, fissures and other leaks that may be present in the system being tested. The preferred vapour which is a mineral oil based fog is light grey in colour. The fog is more easily observed when white light source is applied on the fog. White light may be applied by any type of light source such as a 50 watt halogen lamp. The light reflective pigment in the fog makes it more readily observable when light is applied to the fog.

The external pressure gauge 38 provides a reading of the amount of pressure that that is being applied to the system being tested by measuring the pressure of the fog leaving through the vapour tank outlet 26. This allows the operator to ensure that a pressure is not applied that exceeds a maximum pressure rating that the system being tested can tolerate. Once a pre-set applied pressure of for example 1 psi or 3 psi is reached, the pressure switch 52 prevents the further application of fog under pressure to the system being tested. If there is a leak, the system will therefore lose pressure due to the leak. Pressure switch 52 will not be activated in such a case and the apparatus 1 will resume applying vapour under pressure to the system being tested in an automatic fashion. This continuous application of vapour under pressure will alert the operator to the fact a leak is present in the system being tested. The flow gauge 54 and flow lamp 16 also serve to alert the operator to the fact that there is a continuous flow of vapour under pressure and therefore a leak. The flow lamp 16 is illuminated when fog under pressure is flowing out of the apparatus 1 through vapour tank outlet 26. The flow lamp 16 goes out when the pre-set pressure of preferably either 1 psi or 3 psi is achieved.

Hose 25 connects outlet 46 to the inlet 100 of the pressure gauge 38. Fog under pressure emanating from vapour tank outlet 26 flows through the hose 25 to the pressure gauge 38. The pressure reading is displayed on pressure gauge display 36.

The polarity lamp 18 is illuminated when the leads 24 are connected to the correct poles of a battery.

There are two types of modes available. One mode is the manual mode while the other mode is the pressure limiting mode. The relay assembly 66 functions to change a ground path for each of the two modes. When the mode switch 32 is in the centre position corresponding to the manual mode, the ground path is preferably supplied from a pin (not shown) of the relay. This ground path by-passes the two pressure limiting switches 34, 52. When the mode switch 32 is in either of the two pressure-limiting positions of 1 or 3 psi, the relay assembly 66 is switched to provide a ground path through the pin. The two different pressure limiting modes are differentiated by the use of a series of diodes ensuring that only one of the two pressure limiting modes may be selected at a time.

It is necessary to calibrate the apparatus 1 before use in order to ensure that there are no internal leaks in the apparatus 1. The mode calibration switch actuator 32 is switched to the middle position between the 1 psi setting and the 3 psi setting in order to put the apparatus 1 in a calibration mode. Between 10 psi and 15 psi is applied to the apparatus 1. An appropriate flow rate is set. The flow rate may be for example 20 SCFH.

The calibration achieves two purposes. Firstly the calibration of the apparatus 1 provides an internal leak test. Because the apparatus is used to locate extremely small leaks, it is necessary to prove that any leak that has been located by the apparatus is outside the apparatus and is not an internal leak. Calibration is also necessary to determine an appropriate flow rate.

The calibration is performed in the manual mode. The apparatus is attached to an air supply and preferably a conventional automotive 12-volt battery. The timer 44 is preferable set to 5 minutes or less enabling airflow. The pressure regulator 70 is turned up using knob 28 to indicate 10 psi on the air pressure gauge. During calibration of the apparatus, outflow conduit 12 is not installed in the apparatus. This causes the internal air pressure to rise to 10 psi at which point the timer 44 is turned counter clockwise to an off position. If there is an internal leak, the pressure registered on the air pressure gauge will drop, indicating the leak. If there is no internal leak, the pressure gauge will maintain the initial reading of 10 psi. Once it is established that there is no internal leak, testing of the system for leaks can begin.

For optimal vapour generation an airflow rate of at least 5 SCFH is required. Since the airflow rate is directly related to the air pressure regulator setting, the calibration setting of 10 psi provides an airflow rate between 15 and 25 SCFH depending on the inlet air supply. This ensures that there will be good quality vapour based on the airflow rate, and that the pigment, if used will quickly mix with the mineral oil fluid at the outset.

While the preferred embodiment has been described, those skilled in the art will appreciate that numerous modifications may be made to the embodiments described herein without departing from the spirit of the invention.

What is claimed is:

1. A leak detector for connection to an air supply, the leak detector being adapted to deliver vapour under pressure to a system for detecting leaks in the systems the leak detector comprising:

a housing, defining a chamber, the housing further defining first and second openings;

a tank located in the chamber, the tank defining a fluid chamber for holding a quantity of fluid, the tank further defining an inlet and outlet;

a first conduit for delivering air from the air supply to the fluid chamber, the first conduit having a first end for attachment to the air supply and a second end received through the first opening of said chamber and through the inlet of the fluid chamber for delivering air from the air supply to the fluid chamber, the second end of the first conduit being positioned in the fluid tank to direct air against said fluid whereby a vapour is generated in the tank by contact of the air against the fluid; and a second conduit located in the chamber for delivering the vapour from said fluid chamber to the system, the second conduit having a first end received in the outlet of the fluid chamber and a second end received through the second opening of the housing for connection to the system.

2. A leak detector according to claim 1 wherein the vapour is fog.

3. A leak detector according to claim 1 wherein the fluid is a mineral oil based fluid.

4. A leak detector according to claim 1 further including an air pressure regulator located in the first conduit, the air pressure regulator defining a passageway and an inlet and an outlet in fluid communication with the passageway for permitting air from the first conduit to flow through the air pressure regulator whereby the air pressure regulator regulates the pressure of air flowing through the first conduit.

5. A leak detector according to claim 1 further including an air valve located in the first conduit for preventing air flow through the first conduit when a pre-set air pressure is reached in the first conduit.

6. A leak detector according to claim 1 further comprising a spray nozzle attached to the second end of the first conduit for directing the flow of air against said fluid.

7. A leak detector according to claim 1 further including an air pressure regulator located in the first conduit for controlling the pressure of air from in the first conduit.

8. A leak detector according to claim 1 further including a check valve coupled to the first conduit for preventing vapour from the fluid chamber from flowing into the first conduit.

9. A leak detector according, to claim 1 further including an external air gauge located in the housing operatively connected to the second conduit.

10. A leak detector according to claim 1 wherein the pre-fog fluid includes a reflective pigment.

11. A leak detector according to claim 10 where the pigment is selected from the group consisting of alkaline aluminate photoluminescence pigment, zinc sulphide and rare earth.

12. A leak detector according to claim 1 wherein the leak detector further includes first and second valves located in the housing and connected to the second conduit, said first and second valves being operationally connected to a pressure sensitive switch for preventing flow of the vapour through the second conduit when a preset pressure level is reached.

13. A leak detector according to claim 12 further including a pressure gauge located in the housing and an air pressure conduit in fluid communication between the second conduit and the pressure gauge whereby vapour flows from the second conduit through the air pressure conduit to the pressure gauge for measurement of the pressure of the vapour leaving the second conduit.

* * * * *